(12) United States Patent
Maruhashi

(10) Patent No.: US 9,060,089 B2
(45) Date of Patent: Jun. 16, 2015

(54) POWER CONTROL FOR AN IMAGE FORMING APPARATUS

(71) Applicant: CANON KABUSHIKI KAISHA, Tokyo (JP)

(72) Inventor: Kazuaki Maruhashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/097,239

(22) Filed: Dec. 4, 2013

(65) Prior Publication Data

US 2014/0160516 A1    Jun. 12, 2014

(30) Foreign Application Priority Data

Dec. 11, 2012    (JP) ................................. 2012-270705

(51) Int. Cl.
- G06K 15/00 (2006.01)
- H04N 1/00 (2006.01)
- G06F 3/12 (2006.01)

(52) U.S. Cl.
CPC .... H04N 1/00896 (2013.01); H04N 2201/0094 (2013.01)

(58) Field of Classification Search
CPC .............. H04N 1/034; H04N 1/00411; H04N 1/00413; H04N 1/00896; H04N 2201/0094; H06F 1/32; H06F 1/3284

USPC ......... 358/1.1, 1.13, 1.14, 1.15, 1.18; 399/70, 399/81, 82, 85; 713/322, 323, 324, 326
See application file for complete search history.

(56) References Cited

U.S. PATENT DOCUMENTS

| | | | |
|---|---|---|---|
| 2008/0297494 A1 | 12/2008 | Ozaki | |
| 2009/0089597 A1* | 4/2009 | Sugita | 713/320 |
| 2011/0285765 A1* | 11/2011 | Lamontagne et al. | 347/3 |
| 2011/0296213 A1* | 12/2011 | Ferlitsch et al. | 713/320 |

FOREIGN PATENT DOCUMENTS

| | | |
|---|---|---|
| JP | 09-034578 | 2/1997 |
| JP | 2000-082014 | 3/2000 |
| JP | 2008-293430 | 12/2008 |

\* cited by examiner

*Primary Examiner* — Gabriel Garcia
(74) *Attorney, Agent, or Firm* — Fitzpatrick, Cella, Harper & Scinto

(57) ABSTRACT

In an image forming apparatus having a power button for shifting the apparatus to either a power shutoff state where power supply is shut off or a power-saving state where power supply is limited, the image forming apparatus is shifted to the power-saving state when the press continuing time of the power button is shorter than a threshold, and shifted to the power shutoff state when it is longer than the threshold. When the press continuing time is shorter than the threshold, information indicating that the shift will occur is displayed on a display unit before the image forming apparatus is shifted to the power-saving state.

14 Claims, 14 Drawing Sheets

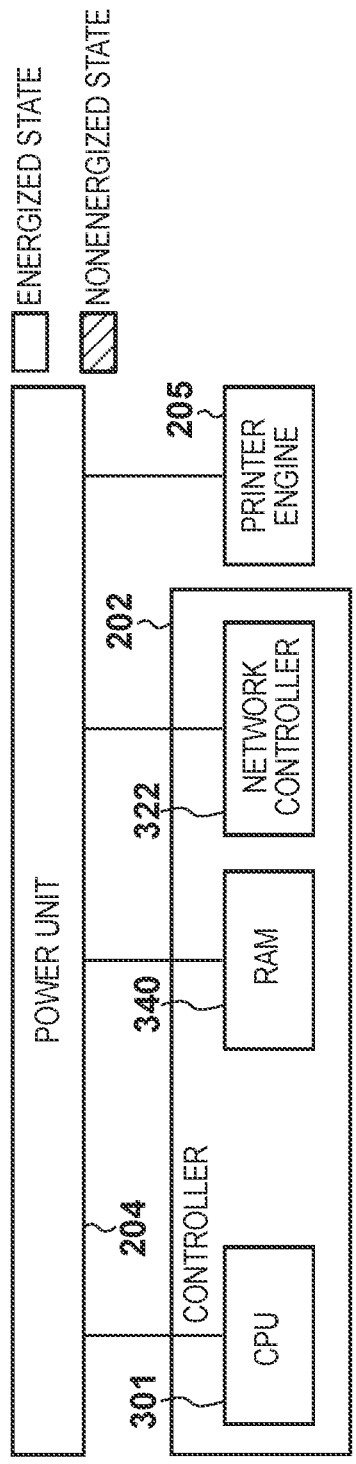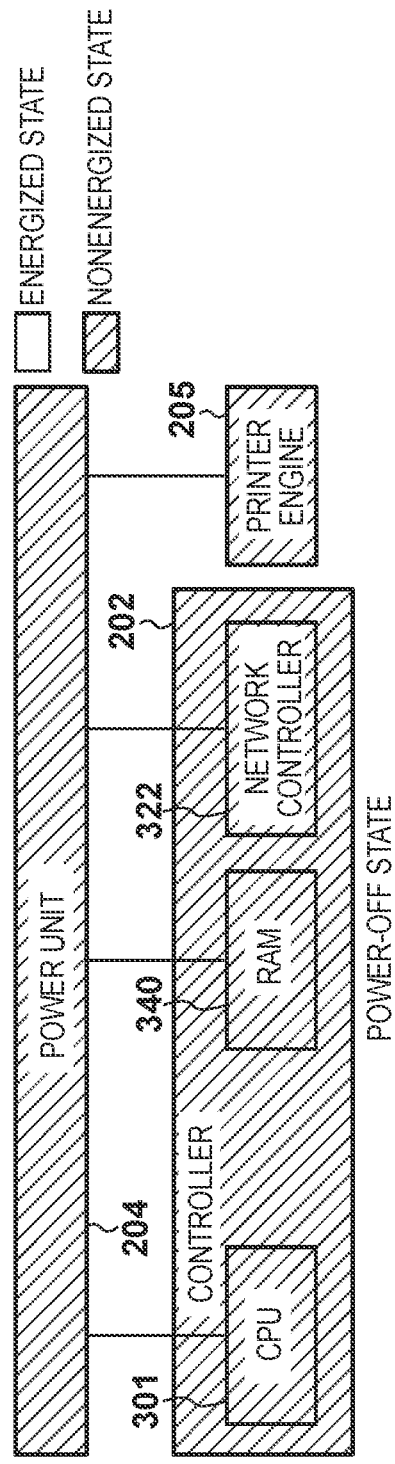

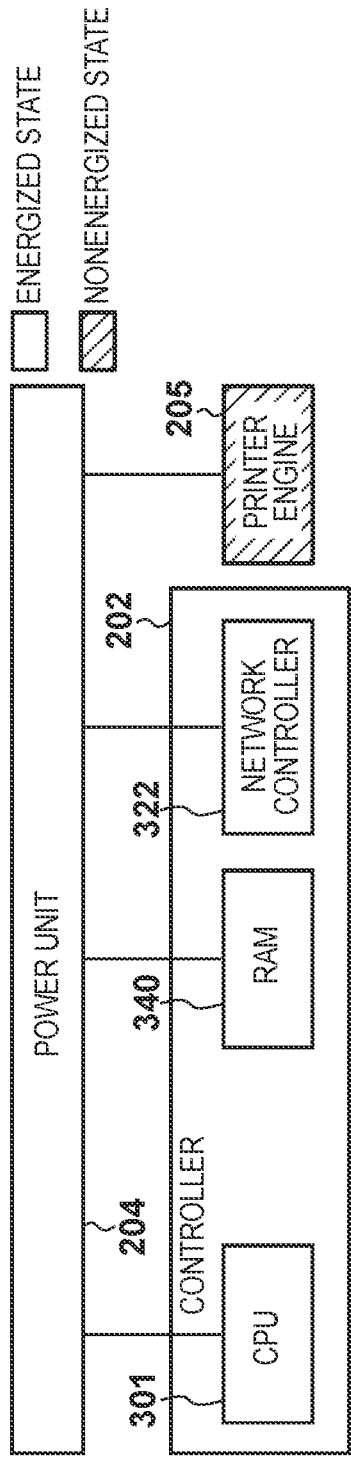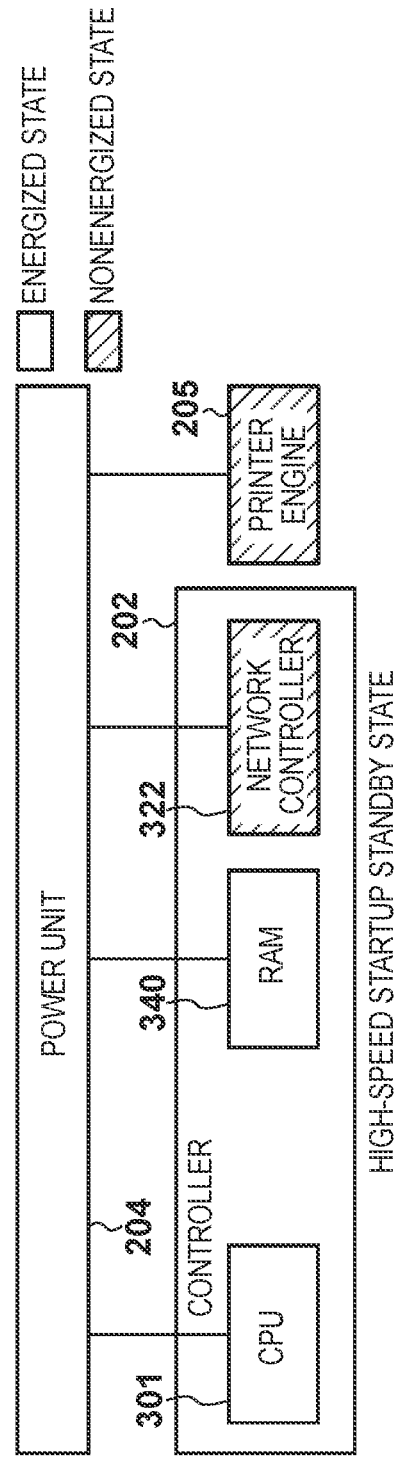

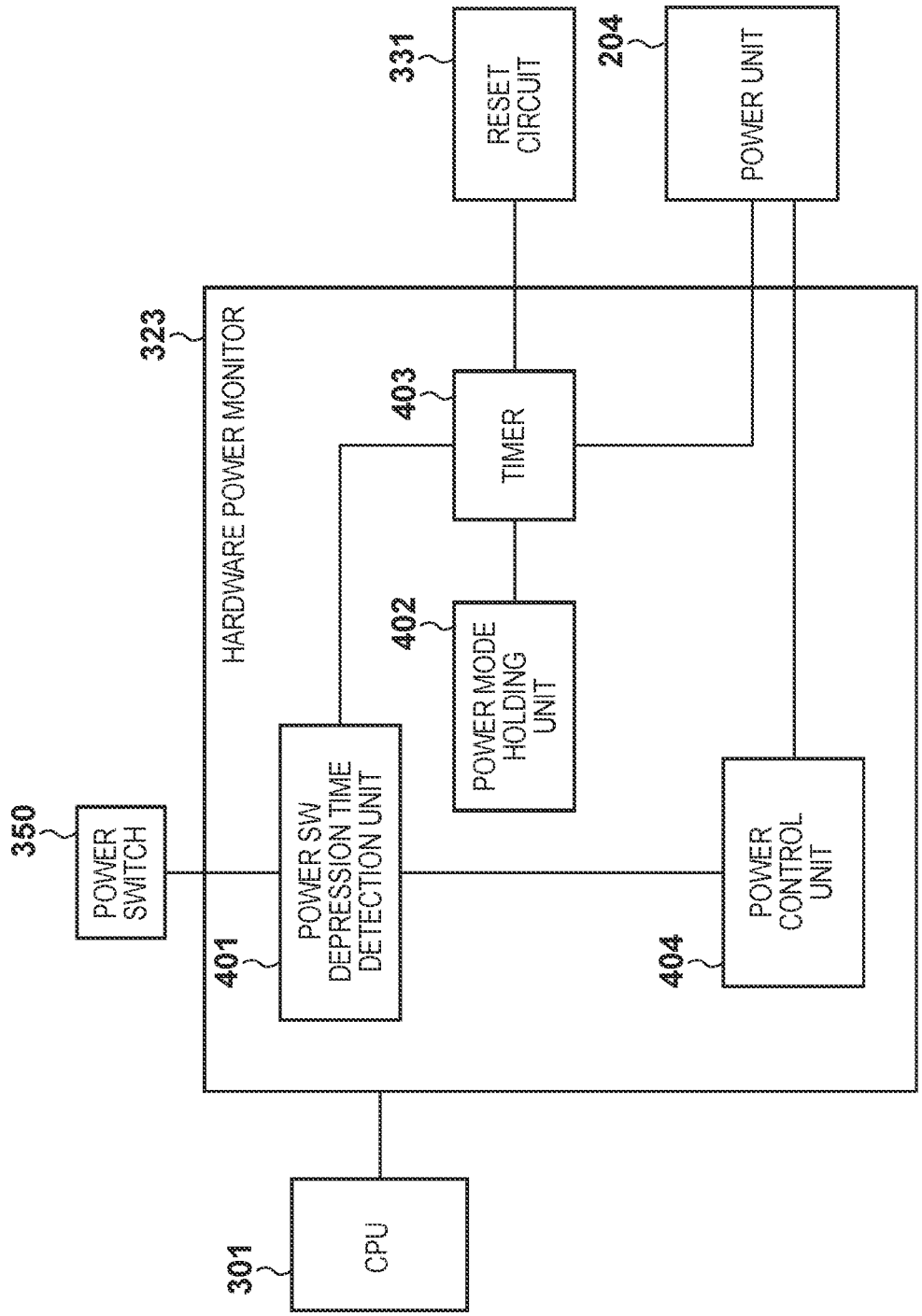

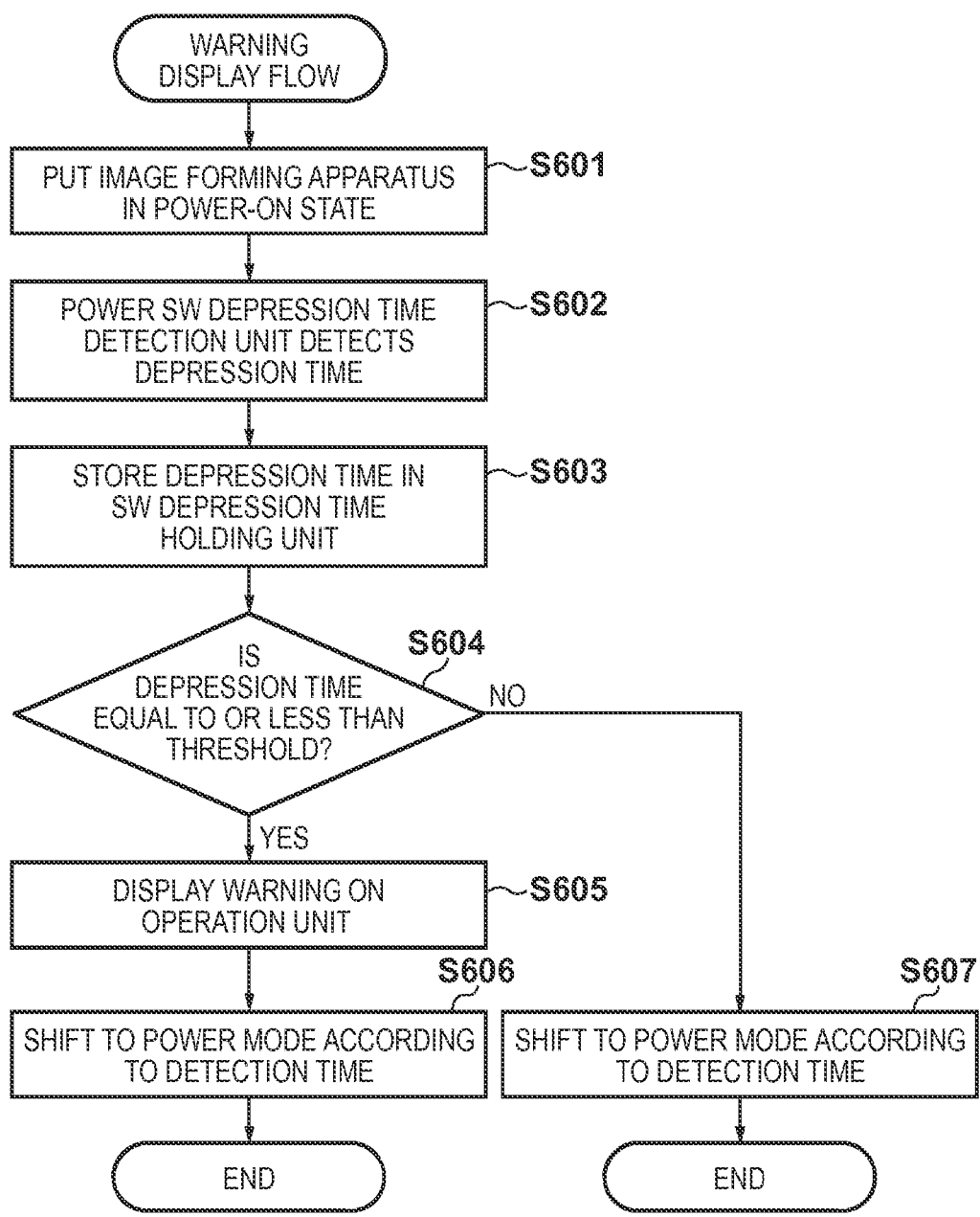

F I G. 7A
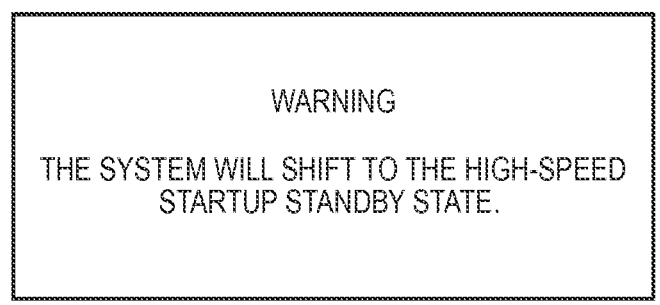
F I G. 7B
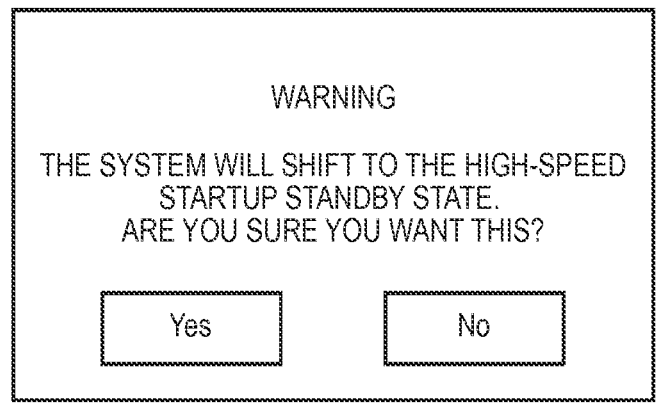

FIG. 10A

WARNING

THE HIGH-SPEED STARTUP STANDBY STATE
HAS BEEN ASSIGNED, WHICH IS DIFFERENT
FROM THE DESIGNATED MODE.

FIG. 10B

WARNING

THE HIGH-SPEED STARTUP STANDBY STATE
HAS BEEN ASSIGNED, WHICH IS DIFFERENT
FROM THE DESIGNATED MODE.
ARE YOU SURE YOU WANT THIS?

| Yes | No |

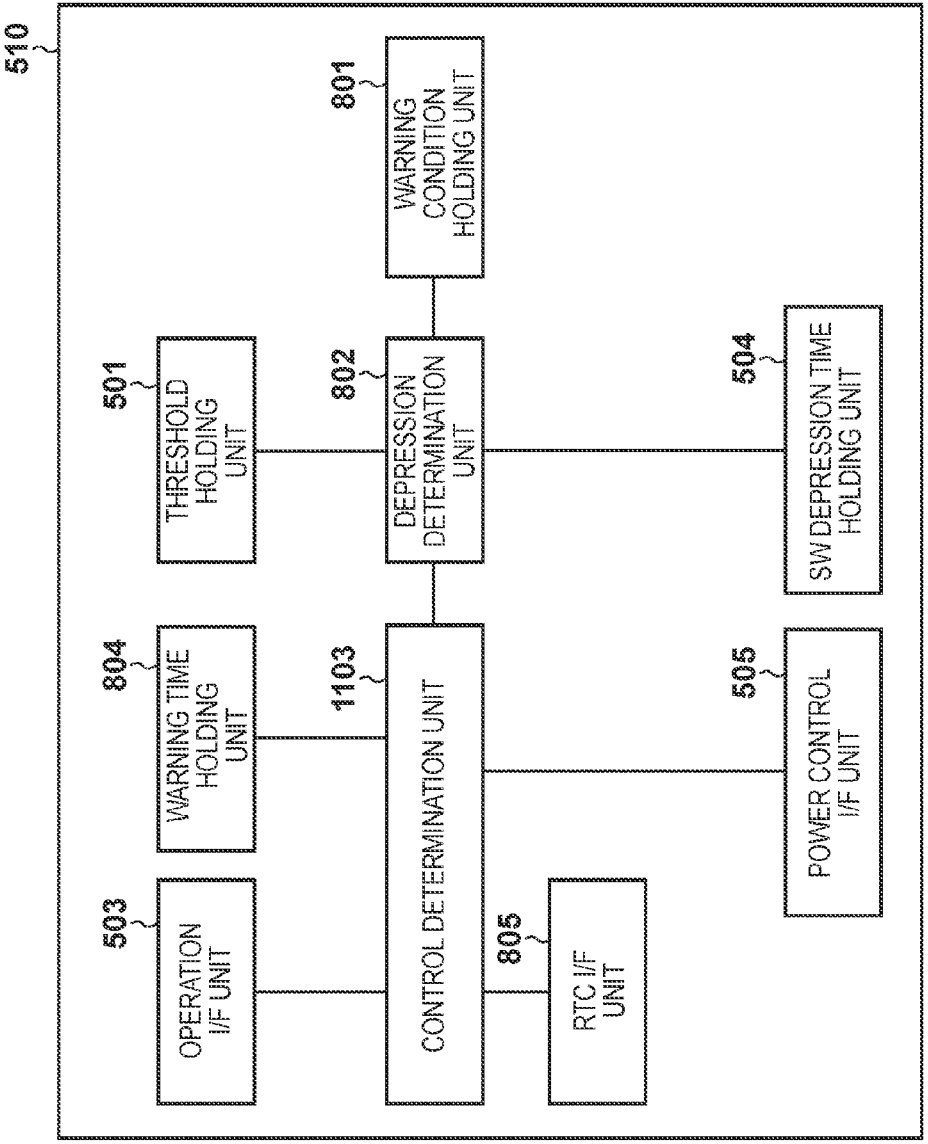

POWER CONTROL FOR AN IMAGE FORMING APPARATUS

BACKGROUND OF THE INVENTION

1. Field of the Invention

The present invention relates to an image forming apparatus having a plurality of power supply states, a control method, and a memory medium for storing a program.

2. Description of the Related Art

In recent years, in image forming apparatuses, typified by printers, the time required for startup tends to be longer. One of the causes for this is that the amount of data to be expanded in RAM from ROM at startup has been increasing with increase in the number of functions achievable by the image forming apparatuses. To solve this problem, there is a technique where data in RAM remains held therein when the user turns off the power switch, to skip the expansion of the data in the RAM from the ROM when the user turns on the power switch next time, thereby shortening the time required for startup. For example, a "suspend" technique is known where data in RAM is held by continuing energizing the RAM (Japanese Patent Laid-Open No. 09-34578). Also known is a "hibernation" technique where data in RAM is held by temporarily saving the data in the RAM to a hard disk (Japanese Patent Laid-Open No. 2000-82014). In these techniques, while it appears for the user that the apparatus is completely powered off, the time required for startup of the apparatus can be shortened.

In the image forming apparatuses, recently, power control in response to a power switch operation by the user has increasingly come to be executed by software processing. Conventionally, power supply and shutoff were switched from one to the other in step with a power switch operation, like a seesaw switch. However, with the recent requests for reducing the size of the apparatuses and for executing power control methods varying with the switch depression time, image forming apparatuses using a tact switch have been increasing to achieve the requests. An image forming apparatus provided with a tact switch is powered on upon depression of the switch when the apparatus is in its power-off state, and powered off upon depression of the switch when the apparatus is in its power-on state. In such a configuration, power control can be performed by software in accordance with the switch depression time.

If the switch is depressed for a period of time not intended by the user due to a wrong operation, etc., however, power control not intended by the user will be performed. To avoid such a problem, a technique is known where, when a switch depression for a period of time exceeding a given time is detected, such a depression is determined to be a wrong operation (Japanese Patent Laid-Open No. 2008-293430).

Normally, in the power-off state where the image forming apparatus is not energized, a program, etc. cannot be previously expanded in the RAM because no power is distributed to the RAM. In this case, after the image forming apparatus is put in the power-on state to restart energization of the interior of the apparatus, and then processing such as expansion of a program in the RAM is performed, the apparatus can become usable to the user. By contrast, by continuing power distribution to the RAM even after the power-off operation (high-speed startup standby state), it is possible to skip processing such as expansion of a program in the RAM at the time of power-on from the power-off state, shortening the time required until the apparatus becomes usable to the user. The convenience to the user can be improved by performing the shift to the power-off state or the high-speed startup standby state according to the depression time of the power switch.

It is necessary that the high-speed startup standby state, which is a RAM energized state, appears the same as the power-off state for the user, and thus the appearance of the image forming apparatus, such as display of LEDs, is configured to be the same as that in the power-off state. However, since the display of LEDs, etc. will be the same even if the user wrongly operates the power switch depression time, such a situation may occur that the user may recognize the apparatus as being in the power-off state but actually the apparatus is in the high-speed startup standby state. In particular, it is not preferable, from the standpoints of safety and power consumption, to leave the apparatus in its high-speed startup standby state that is an internally energized state unintentionally.

According to Japanese Patent Laid-Open No. 2008-293430, when the power switch is kept depressed over a period of time exceeding a given time, this is detected as a wrong operation. However, such detection of a wrong operation is not effective for a case where the apparatus is wrongly shifted to the high-speed startup standby state, although it should be shifted to the power-off state, because the depression time is short.

SUMMARY OF THE INVENTION

An aspect of the present invention is to eliminate the above-mentioned problems with the conventional technology. The present invention provides an image forming apparatus that detects an operation by short-time depression, a control method, and a memory medium for storing a program.

The present invention in one aspect provides an image forming apparatus having a power button for shifting the apparatus to either a power shutoff state where power supply is shut off or a power-saving state where power supply is limited, a press continuing time of the power button for the power-saving state being made different from a press continuing time of the power button for the power shutoff state, the apparatus comprising: a power control unit configured to shift the image forming apparatus to the power-saving state in a case where the press continuing time of the power button is shorter than a threshold, and shift the image forming apparatus to the power shutoff state in a case where the press continuing time is longer than the threshold; and a display control unit configured to control a display to display information indicating that the shift occurs before the power control unit shifts the image forming apparatus to the power-saving state in a case where the press continuing time is shorter than the threshold.

According to the present invention, an operation by short-time depression can be detected.

Further features of the present invention will become apparent from the following description of exemplary embodiments with reference to the attached drawings.

BRIEF DESCRIPTION OF THE DRAWINGS

FIGS. 3A to 3D are views each showing the power supply state of the image forming apparatus.

FIG. 4 is a view showing a block configuration of a hardware power monitor.

FIG. 6 is a view showing a procedure of the processing of power mode shift control in Embodiment 1.

FIGS. 7A and 7B are views showing examples of warning messages.

FIGS. 10A and 10B are views showing examples of warning messages.

FIG. 11 is a view showing a block configuration of software in Embodiment 3.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that like constituent elements will be denoted by like reference signs, and redundant descriptions thereof will not be given.

Embodiment 1

Configuration of Apparatus

Figure 1:
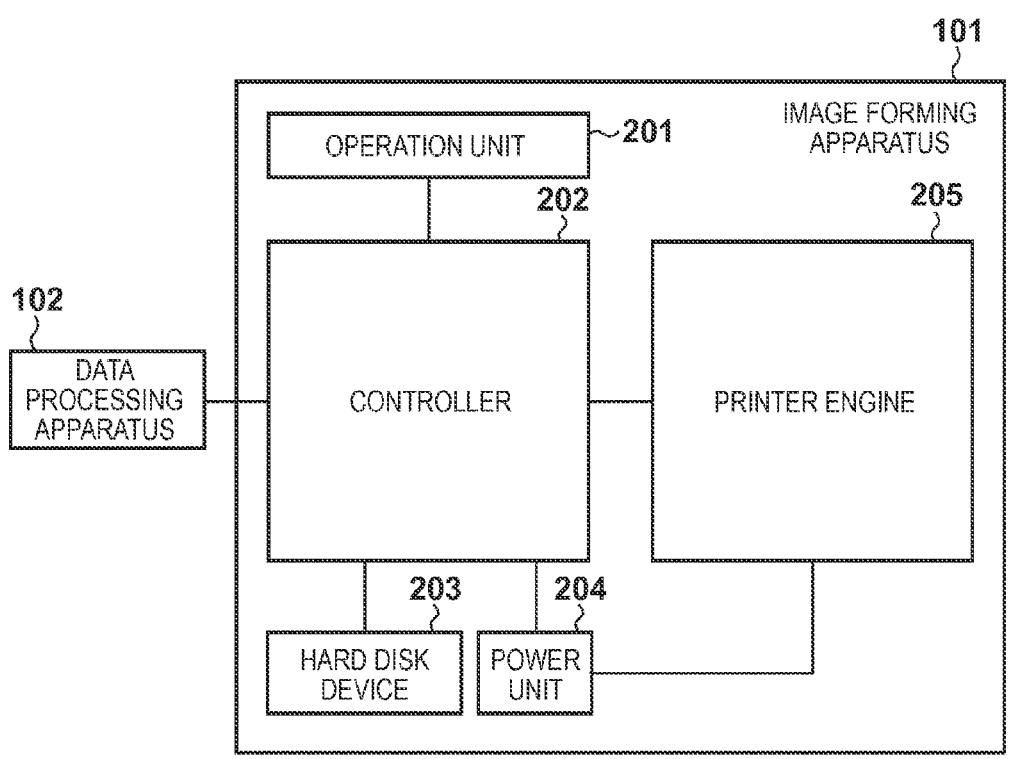
FIG. 1 is a block diagram showing a configuration of an image forming apparatus.

FIG. 1 is a block diagram showing a configuration of an image forming apparatus in an embodiment of the present invention. A data processing apparatus 102 is a general PC, for example, and issues a print job to an image forming apparatus 101 via a network such as a LAN and gives various kinds of instructions such as printing to the image forming apparatus 101. The image forming apparatus 101 is a printer having the printing function, for example. The image forming apparatus 101 may otherwise be a multifunctional peripheral (MFP) where not only the printing function but also the scanning function, the facsimile function, etc. are integrated. A controller 202 of the image forming apparatus 101 gives instructions to other units, controls the image forming apparatus 101 comprehensively, and executes the functions of the image forming apparatus 101. A printer engine 205 has a configuration for printing (recording) an image on a printing medium such as a print sheet based on image data under an instruction from the controller 202. An operation unit 201 accepts a user operation for the image forming apparatus 101. The operation unit 201 includes operation buttons with which the user performs various settings of the image forming apparatus 101 and a display panel (an example of a display unit) such as a liquid crystal screen on which the state information, etc. of the image forming apparatus 101 are displayed for the user. A hard disk device 203 stores image data to be printed and resource information used at the printing of the image data. The resource information is printing authority information, etc., for example. A power unit 204, connected to an external AC power source, supplies power to the other units of the image forming apparatus 101.

Figure 2:
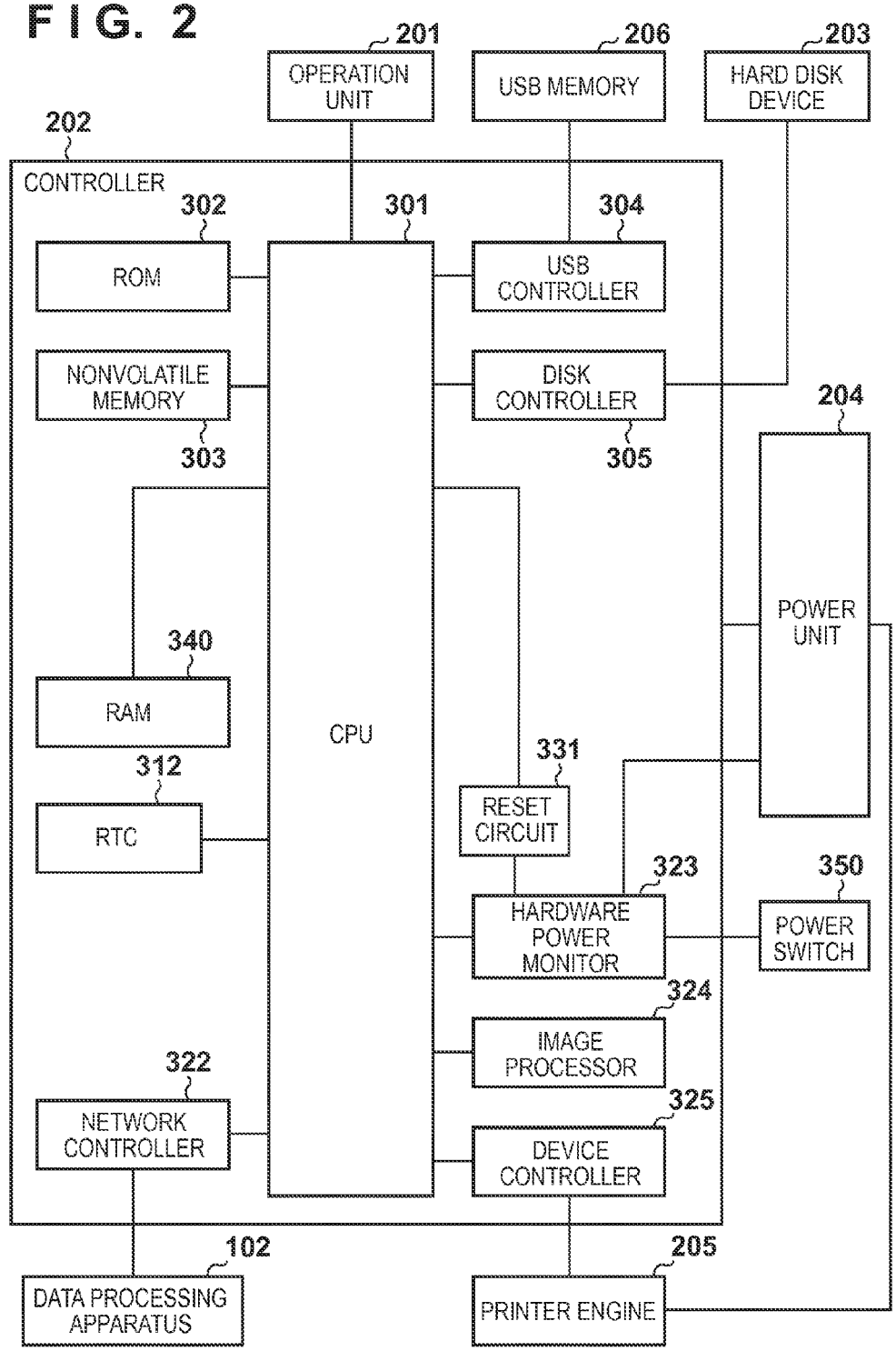
FIG. 2 is a view showing a block configuration of a controller of the image forming apparatus.

FIG. 2 is a view showing a block configuration of the controller 202 of the image forming apparatus 101. The controller 202, which controls the entire of the image forming apparatus 101, includes the following blocks. A CPU 301 is a CPU that controls the entire of the controller 202. Although not shown, the CPU 301 includes hardware peripherals of the CPU such as a chip set, a bus bridge, and a clock generator. A ROM 302 stores a control program executed by the CPU 301. A nonvolatile memory 303 stores setting information of the image forming apparatus 101 and printing-related counter information, and holds the stored information even when receiving no power supply. A USB controller 304 controls input/output of data to/from a USB memory 206. The USB memory 206 stores image data, etc. to be printed. A disk controller 305 controls input/output of data to/from the hard disk device 203.

A reset circuit 331 initializes the states of the circuits and memories of the controller 202. A RTC 312 has a clock function of measuring the current time and notifying the CPU 301 of the time as required. A network controller 322 transmits/receives data to/from the data processing apparatus 102 via a network such as a LAN. A hardware power monitor 323 controls the power unit 204 according to an instruction from the CPU 301. The hardware power monitor 323 also can initialize the controller 202 via the reset circuit 331 under an instruction from the CPU 301. In addition, the hardware power monitor 323 can permit supply of power to the controller 202 according to depression of a power switch 350 even when no power is being supplied to the CPU 301.

An image processor 324 performs various kinds of image processing, such as space transformation processing, resolution processing, and rotation processing, for image data. A device controller 325 controls the printer engine 205. If the image forming apparatus 101 has the facsimile function, the scanning function, etc., the device controller 325 also controls device engines corresponding to these functions. A RAM 340, which is a volatile memory, is used as working memory for the CPU 301. The CPU 301 reads the control program stored in the ROM 302, and executes the program by expanding it in the RAM 340.

FIGS. 3A to 3D are views each showing the power supply state of the image forming apparatus 101. Note herein that the situation that the power supply to the image forming apparatus 101 is stopped includes, not only the case that the power supply becomes zero, but also the case that an amount of power so minute that the power supply destination fails to operate normally is being supplied.

FIG. 3A is a view showing the case where the image forming apparatus 101 is in its power-on state (first power mode). In the power-on state, power is supplied to the units of the image forming apparatus 101. When a predetermined time has elapsed with no function being executed in the power-on state shown in FIG. 3A, the state shifts to a power-saving state shown in FIG. 3C. Also, in the power-on state shown in FIG. 3A, when the user depresses the power button to power off the apparatus, the state shifts to a power-off state (where the power is shut off) shown in FIG. 3B under a predetermined condition. The state shifts to the power-off state shown in FIG. 3B, for example, in a case where a long-time depression operation of putting the power button in its depressed state for a period of time equal to or more than a predetermined time may be performed. In the power-on state, also, when the user depresses the power button to power off the apparatus, the state shifts to a high-speed startup standby state shown in FIG. 3D under a predetermined condition. The state shifts to the high-speed startup standby state shown in FIG. 3D, for example, in a case where a short-time depression operation of putting the power button in its depressed state for a period of time within the predetermined time may be performed.

FIG. 3B is a view showing the case where the image forming apparatus 101 is in its power-off state (third power mode). In the power-off state, the power supply to the units of the image forming apparatus 101 is stopped. In the power-off state shown in FIG. 3B, when the user depresses the power button to power on the apparatus, the state shifts to the power-on state shown in FIG. 3A. In the shift from the power-off state shown in FIG. 3B to the power-on state shown in FIG. 3A, the CPU 301 reads the control program from the ROM 302 and expands the program in the RAM 340. Accordingly, the time required to complete the startup is long compared with the startup from the high-speed startup standby state in FIG. 3D.

FIG. 3C is a view showing the case where the image forming apparatus 101 is in its power-saving state where limitation is posed on the power supply. In the power-saving state, while the power supply to the CPU 301, the RAM 340, the network controller 322, and the power unit 204 is maintained, the power supply to the other units is stopped. In the power-saving state shown in FIG. 3C, when data is input into the network controller 322 or when the user depresses a power-saving state release button of the, the state shifts to the power-on state shown in FIG. 3A. In the power-saving state, also, when the user depresses the power button to power off the apparatus the operation unit 201, the state shifts to the power-off state shown in FIG. 3B under a predetermined condition. The state shifts to the power-off state shown in FIG. 3B, for example, in a case where a long-time depression operation of putting the power button in its depressed state for a period of time equal to or more than a predetermined time may be performed. In the power-saving state, also, when the user depresses the power button to power off the apparatus, the state shifts to the high-speed startup standby state shown in FIG. 3D under a predetermined condition. The state shifts to the high-speed startup standby state shown in FIG. 3D, for example, in a case where a short-time depression operation of putting the power button in its depressed state for a period of time within the predetermined time may be performed.

FIG. 3D is a view showing the case where the image forming apparatus 101 is in its high-speed startup standby state (second power mode) as another power-saving state. In the second power mode, while the power supply to the CPU 301 and the RAM 340 is maintained, the power supply to the other units is stopped. In the high-speed startup standby state shown in FIG. 3D, when the user depresses the power button to power on the apparatus, the state shifts to the power-on state shown in FIG. 3A. In the shift from the high-speed startup standby state shown in FIG. 3D to the power-on state shown in FIG. 3A, the CPU 301 uses the main program already expanded in the RAM 340. Accordingly, the time required to complete the startup is short compared with the startup from the power-off state shown in FIG. 3B. Power consumption in the high-speed startup standby state is higher than that in the power-off state shown in FIG. 3B and lower than that in the power-saving state shown in FIG. 3C. The magnitude correlation on power consumption is FIG. 3A>FIG. 3C>FIG. 3D>FIG. 3B. Also, the magnitude correlation on the speed of shift to the power-on state shown in FIG. 3A is FIG. 3C>FIG. 3D>FIG. 3B. Note that, in the high-speed startup standby state, it may be configured so that the state shifts to the power-off state shown in FIG. 3B when a long-time depression operation of putting the power button in its depressed state for a period of time equal to or more than a predetermined time is performed.

Operation of Hardware Power Monitor

Next, the operation of the hardware power monitor 323 will be described. FIG. 4 is a view showing a block configuration of the hardware power monitor 323. In FIG. 4, the hardware power monitor 323 includes a power SW depression time detection unit 401, a power mode holding unit 402, a timer 403, and a power control unit 404. The power SW depression time detection unit 401 detects depression of the power SW 350, and, by detecting the depression time (the depression continuing time for which the depressed state continues) with the timer 403, informs the CPU 301 of the depression time. The power mode holding unit 402 stores power mode information corresponding to the state of power supply to the controller 202. The timer 403 is a hardware timer that monitors the power mode shift processing. For example, the timer 403 can reset the CPU 301 via the reset circuit 331, or control the power supply to the controller 202 from the power unit 204, a predetermined time after the image forming apparatus 101 has last accepted a user operation. The power control unit 404 controls the power supply to the controller 202 from the power unit 204 according to an instruction from the CPU 301.

Figure 5:
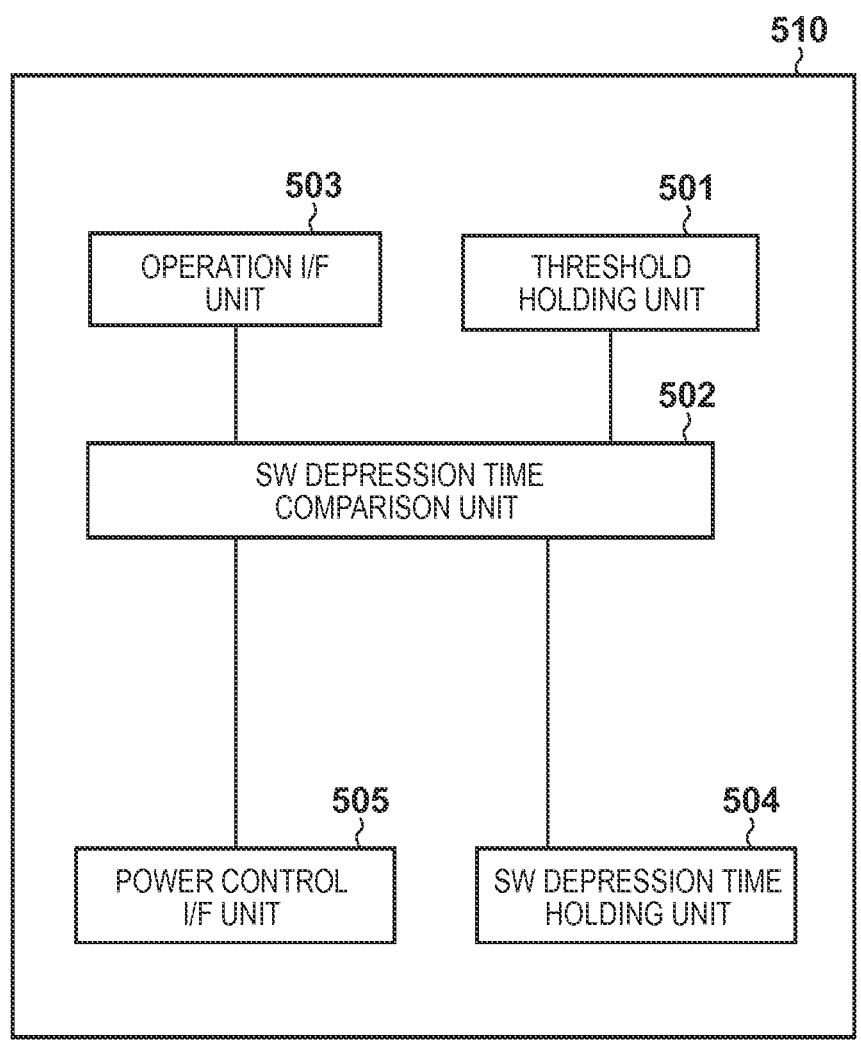
FIG. 5 is a view showing a block configuration of software in Embodiment 1.

Next, the configuration of software executed by the CPU 301 in this embodiment will be described. FIG. 5 is a view showing a block diagram of software 510 executed by the CPU 301. The software 510 includes a threshold holding unit 501, a SW depression time comparison unit 502, an operation I/F unit 503, a SW depression time holding unit 504, and a power control I/F unit 505.

The threshold holding unit 501 holds the depression time of the power switch 350 required for the image forming apparatus 101 that is in the power-on state shown in FIG. 3A to shift to the high-speed startup standby state or the power-off state. The threshold held in the threshold holding unit 501 is also held in the nonvolatile memory 303 and can be changed to an arbitrary value by an administrator, etc. The threshold is stored in the nonvolatile memory 303 at the factory, for example. The SW depression time holding unit 504 holds the time detected by the power SW depression time detection unit 401.

The SW depression time comparison unit 502 compares the threshold held in the threshold holding unit 501 with the depression time held in the SW depression time holding unit 504. Based on the comparison result, the SW depression time comparison unit 502 issues an instruction on power mode shift control to the power control I/F unit 505. The instruction here is such that the apparatus be shifted to the high-speed startup standby state if the depression time in the SW depression time holding unit 504 is shorter than the threshold in the threshold holding unit 501 and shifted to the power-off state if the former is longer than the latter. Based on the instruction from the SW depression time comparison unit 502, the power control I/F unit 505 controls the power control unit 404 to permit shifting to either the high-speed startup standby state or the power-off state.

If the user makes a mistake in the depression time, then the apparatus will naturally shift to a power mode that is not intended by the user. It is presumed that the wrong operation that may occur in this case is mostly depressing the power switch 350 for a shorter time than the threshold (i.e., unintended short-time depression operation). Therefore, the SW depression time comparison unit 502 issues an instruction to display a warning for the user to the operation I/F unit 503 if the depression time in the SW depression time holding unit 504 is shorter than the threshold held in the threshold holding unit 501. When receiving the warning instruction from the SW depression time comparison unit 502, the operation I/F unit 503 controls the operation unit 201 to display the warning. The user, noticing the warning display, can be notified of the shift to the high-speed startup standby state.

FIG. 6 is a flowchart showing the procedure of the processing of the power mode shift control in this embodiment. The processing steps shown in FIG. 6 are achieved by execution of the control program in the ROM 302 by the CPU 301, for example.

In S601, the image forming apparatus 101 is in its power-on state shown in FIG. 3A. In S602, the power SW depression time detection unit 401 detects and acquires the depression time of the power switch 350. In S603, the detected depression time is stored in the SW depression time holding unit 504. In S604, whether the depression time of the power switch 350 stored in the SW depression time holding unit 504 is equal to or less than the threshold stored in the threshold holding unit 501 is determined. If the depression time of the power switch 350 is determined to be equal to or less than the threshold, the process proceeds to S605. In S605, the operation I/F unit 503 controls the operation unit 201 to display a warning message on the display panel.

FIGS. 7A and 7B are views showing examples of the warning message displayed in the operation unit 201. In S605, as shown in FIG. 7A, "The system will shift to the high-speed startup standby state." is displayed. After the display, in S606, the image forming apparatus 101 is shifted to the high-speed startup standby state (second power mode). If the depression time of the power switch 350 stored in the SW depression time holding unit 504 is more than the threshold stored in the threshold holding unit 501 in S604, the process proceeds to S607. In S607, the image forming apparatus 101 is shifted to the power-off state (third power mode).

In this embodiment, in S605, the display may otherwise be "The system will shift to the high-speed startup standby state. Are you sure you want this?" as shown in FIG. 7B. In this case, the configuration may be made to shift the apparatus to the high-speed startup standby state in S606 if "Yes" button is depressed and shift it to the power-off state in S607 if "No" button is depressed. Alternatively, if "No" button is depressed, the configuration may be made to display a message that re-operation of the power switch 350 will be accepted.

As described above, in this embodiment, the depression time of the power switch 350 is determined, and if the depression time is equal to or less than the threshold, a warning is displayed for the user. This makes it possible to detect such a wrong operation that the depression time of the power switch 350 becomes shorter than the threshold.

Embodiment 2

In Embodiment 1, displaying a warning message in the case of short-time depression has been described. In this embodiment, display of the warning is limited to some time period, whereby warning display is prohibited in the time periods in which the display is intrinsically unnecessary, and such a warning message is displayed only in a time period in which there is a high possibility that warning display is necessary.

For example, the apparatus is put in the power-off state in principle at the close of work on Mondays to Thursdays. On these days, even if the apparatus has shifted to the high-speed startup standby state by mistakenly performing short-time depression of the power switch 350, display of a warning message on the wrong operation is not necessarily required because there is an advantage that the startup will not take time next day. However, at the close of work on Fridays, if the apparatus is not put in the power-off state, unnecessary power will be consumed over two days, Saturday and Sunday. Therefore, it is ensured that the warning message be displayed when a short-time depression operation is detected in the closing time period on Fridays.

Figure 8:
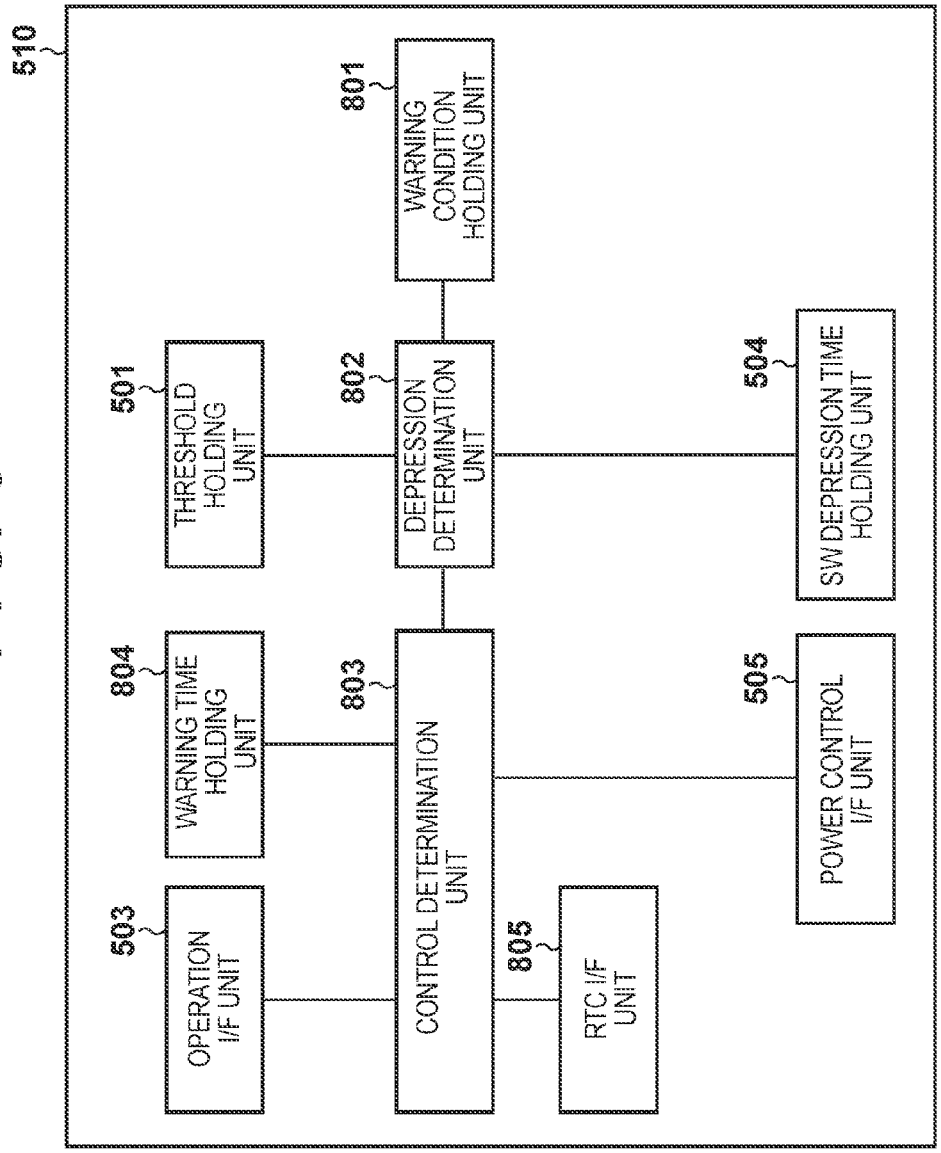
FIG. 8 is a view showing a block configuration of software in Embodiment 2.

FIG. 8 is a view showing a block configuration of software 510 executed by the CPU 301 in this embodiment. The software 510 includes a threshold holding unit 501, an operation I/F unit 503, a warning condition holding unit 801, a depression determination unit 802, a control determination unit 803, a warning time holding unit 804, a RTC I/F unit 805, a SW depression time holding unit 504, and a power control I/F unit 505.

The threshold holding unit 501 holds the threshold of the depression time of the power switch 350 required for the image forming apparatus 101 that is in the power-on state shown in FIG. 3A to shift to the high-speed startup standby state or the power-off state. The threshold held in the threshold holding unit 501 is held in the nonvolatile memory 303 and can be changed to an arbitrary value. The warning condition holding unit 801 holds a condition for determining the depression time of the power switch 350 to be an action to be warned. For example, the warning condition holding unit 801 holds setting of a warning display condition that a warning message be displayed when the depression time of the power switch 350 is equal to or less than the threshold held in the threshold holding unit 501. The SW depression time holding unit 504 holds the depression time detected by the power SW depression time detection unit 401. The depression determination unit 802 determines whether the depression time held in the SW depression time holding unit 504 satisfies the condition for displaying the warning message based on the threshold held in the threshold holding unit 501 and the setting of the warning display condition held in the warning condition holding unit 801. If it is determined that the depression time satisfies the warning display condition, the depression determination unit 802 notifies the control determination unit 803 of this determination. For example, the depression determination unit 802 notifies the control determination unit 803 that the apparatus should shift to the high-speed startup standby state (second power mode) if the depression time held in the SW depression time holding unit 504 is equal to or less than the threshold held in the threshold holding unit 501. The warning time holding unit 804 holds information on the warning display time period in which the warning message is displayed, such as 17:00 to 24:00 on Fridays, for example. The information held in the warning time holding unit 804 is held in the nonvolatile memory 303 and can be changed to an arbitrary value by an administrator, etc.

The RTC I/F unit 805 receives the current time measured by the RTC 312 as required. When the time received from the RTC I/F unit 805 falls within the time period held in the warning time holding unit 804 and a notification that the warning display condition is satisfied is received from the depression determination unit 802, the control determination unit 803 issues an instruction to display the warning message to the operation I/F unit 503. When receiving the instruction to display the warning message from the control determination unit 803, the operation I/F unit 503 displays the warning message on the display panel of the operation unit 201.

After issuing the instruction to display the warning message to the operation I/F unit 503, the control determination unit 803 issues an instruction to shift the apparatus to the power mode, designated by the depression determination unit 802 as the power mode to be shifted to, to the power control I/F unit 505. The instruction here is such that the apparatus be shifted to the high-speed startup standby state if the depression time held in the SW depression time holding unit 504 is shorter than the threshold held in the threshold holding unit 501 and shifted to the power-off state if the former is longer than the latter. If the warning display condition for displaying the warning message is not satisfied, the control determination unit 803 issues an instruction to shift the apparatus to the designated power mode to the power control I/F unit 505 without issuing an instruction to display the warning message to the operation I/F unit 503. Based on the instruction from the control determination unit 803, the power control I/F unit 505 gives an instruction to shift the apparatus to either the high-speed startup standby state or the power-off state to the power control unit 404.

Figure 9:
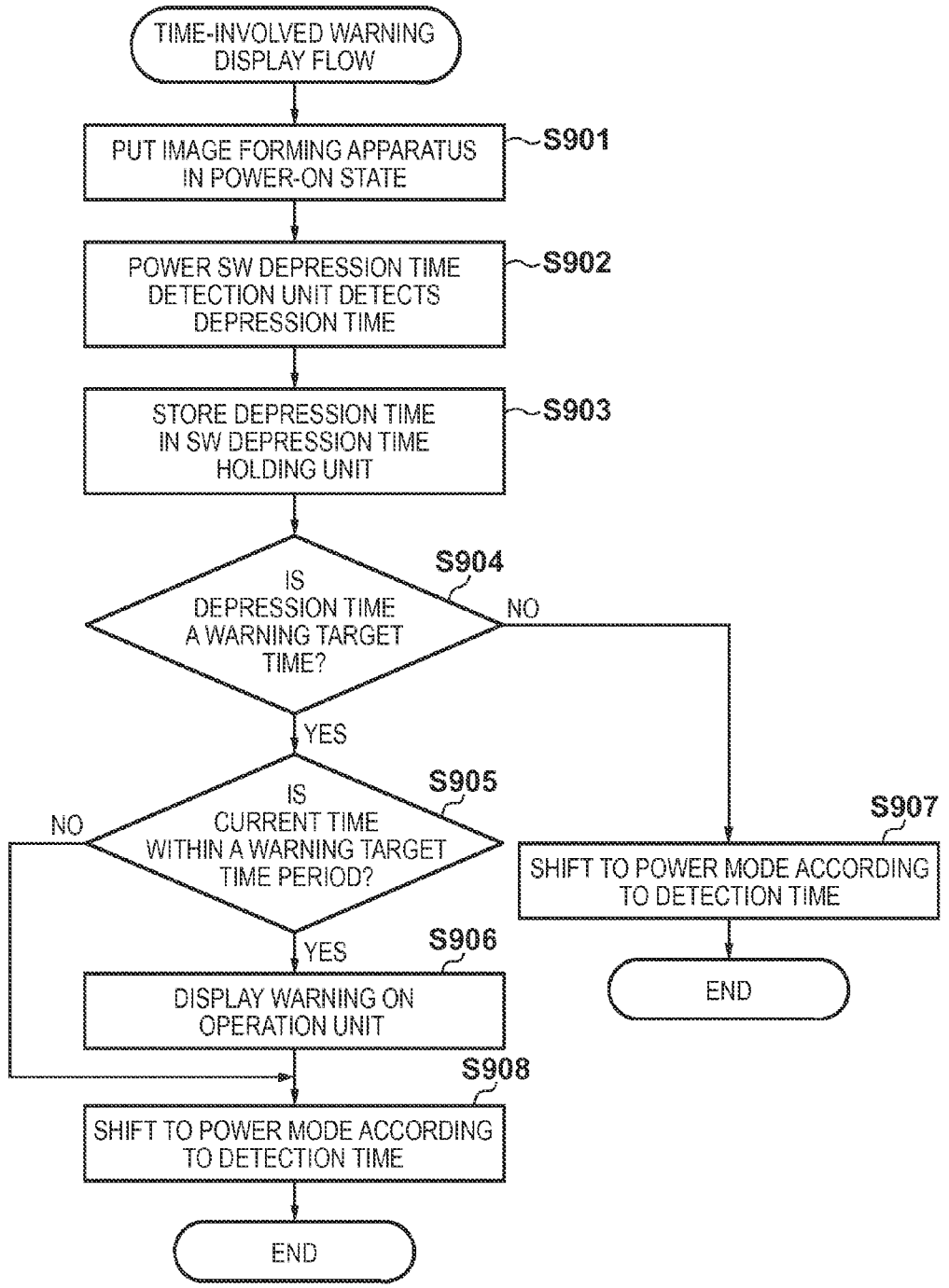
FIG. 9 is a view showing a procedure of the processing of power mode shift control in Embodiment 2.

FIG. 9 is a flowchart showing the procedure of the processing of the power mode shift control in this embodiment. The processing steps shown in FIG. 9 are achieved by execution of the control program in the ROM 302 by the CPU 301, for example.

In S901, the image forming apparatus 101 is in its power-on state shown in FIG. 3A. In S902, the power SW depression time detection unit 401 detects and acquires the depression time of the power switch 350. In S903, the detected depression time is stored in the SW depression time holding unit 504. In S904, if the depression time of the power switch 350 stored in the SW depression time holding unit 504 satisfies the setting of the warning display condition held in the warning condition holding unit 801, the process proceeds to S905. If the depression time does not satisfy the setting of the warning display condition held in the warning condition holding unit 801, the process proceeds to S907. In S907, the apparatus is shifted to the power mode corresponding to the depression time of the power switch 350. For example, it is shifted to the power-off state shown in FIG. 3B if the depression time is larger than the threshold.

In S905, it is determined whether the current time received by the RTC I/F unit 805 falls within the warning display time period held in the warning time holding unit 804. If it is determined that the current time falls within the warning display time period, the process proceeds to S906. Otherwise, the process proceeds to S908. In S906, the operation I/F unit 503 gives an instruction to display the warning message to the operation unit 201. In S908, the apparatus is shifted to the power mode corresponding to the depression time of the power switch 350. For example, it is shifted to the high-speed startup standby state shown in FIG. 3D if the depression time is equal to or less than the threshold.

FIGS. 10A and 10B are views showing examples of the warning message displayed in the operation unit 201. In S906, as shown in FIG. 10A, "The high-speed startup standby state has been assigned, which is different from the designated mode." is displayed. Alternatively, in S906, the display may be "The high-speed startup standby state has been assigned, which is different from the designated mode. Are you sure you want this?" as shown in FIG. 10B. In this case, the configuration may be made to shift the apparatus to the high-speed startup standby state in S908 if "Yes" button is depressed and shift it to the power-off state in S907 if "No" button is depressed. Otherwise, if "No" button is depressed, the configuration may be made to display a message that re-operation of the power switch 350 will be accepted.

As described above, in this embodiment, the conditions for displaying the warning message are limited to an arbitrary time period designated by the user and an arbitrary power switch depression time. This makes it possible to display the warning message only when necessary.

Embodiment 3

In this embodiment, it is possible to re-accept setting of power mode shift from the user. FIG. 11 is a view showing a block configuration of software 510 executed by the CPU 301 in this embodiment. The software 510 includes a threshold holding unit 501, an operation I/F unit 503, a warning condition holding unit 801, a depression determination unit 802, a control determination unit 1103, a warning time holding unit 804, a RTC I/F unit 805, a SW depression time holding unit 504, and a power control I/F unit 505.

The threshold holding unit 501 holds the threshold of the depression time of the power switch 350 required for the image forming apparatus 101 that is in the power-on state shown in FIG. 3A to shift to the high-speed startup standby state or the power-off state. The threshold held in the threshold holding unit 501 is held in the nonvolatile memory 303 and can be changed to an arbitrary value by an administrator, etc. The warning condition holding unit 801 holds a condition for determining the depression time of the power switch 350 to be an action to be warned. For example, the warning condition holding unit 801 holds setting of a warning display condition that a warning message be displayed when the depression time of the power switch 350 is equal to or less than the threshold held in the threshold holding unit 501. The SW depression time holding unit 504 holds the depression time detected by the power SW depression time detection unit 401. The depression determination unit 802 determines whether the depression time held in the SW depression time holding unit 504 satisfies the condition for displaying the warning message based on the threshold held in the threshold holding unit 501 and the setting of the warning display condition held in the warning condition holding unit 801. If it is determined that the depression time satisfies the warning display condition, the depression determination unit 802 notifies the control determination unit 1103 of this determination. For example, the depression determination unit 802 notifies the control determination unit 1103 that the apparatus should shift to the high-speed startup standby state (second power mode) if the depression time held in the SW depression time holding unit 504 is equal to or less than the threshold held in the threshold holding unit 501. The warning time holding unit 804 holds information on the warning display time period in which the warning message is displayed, such as 17:00 to 24:00 on Fridays, for example. The information held in the warning time holding unit 804 is held in the nonvolatile memory 303 and can be changed to an arbitrary value by an administrator, etc.

The RTC I/F unit 805 receives the current time measured by the RTC 312 as required. When the time received from the RTC I/F unit 805 falls within the time period held in the warning time holding unit 804 and a notification that the warning display condition is satisfied is received from the depression determination unit 802, the control determination unit 1103 issues an instruction to display the warning message to the operation I/F unit 503. When receiving the instruction to display the warning message from the control determination unit 803, the operation I/F unit 503 displays the warning message on the display panel of the operation unit 201. The operation I/F unit 503 also receives designation of the power mode to be shifted to from the user via the operation unit 201 and notifies the control determination unit 1103 of the received power mode.

Upon receiving the power mode to be shifted to from the operation I/F unit 503, the control determination unit 1103 issues an instruction to shift the apparatus to the designated power mode to the power control I/F unit 505. The instruction here is such that the apparatus be shifted to the high-speed startup standby state if the depression time held in the SW depression time holding unit 504 is shorter than the threshold held in the threshold holding unit 501 and shifted to the power-off state if the former is longer than the latter. If the warning display condition for displaying the warning message is not satisfied, the control determination unit 1103 issues an instruction to shift the apparatus to the designated power mode to the power control I/F unit 505 without issuing an instruction to display the warning message to the operation I/F unit 503. Based on the instruction from the control determination unit 1103, the power control I/F unit 505 gives an instruction to shift the apparatus to either the high-speed startup standby state or the power-off state to the power control unit 404.

Figure 12:
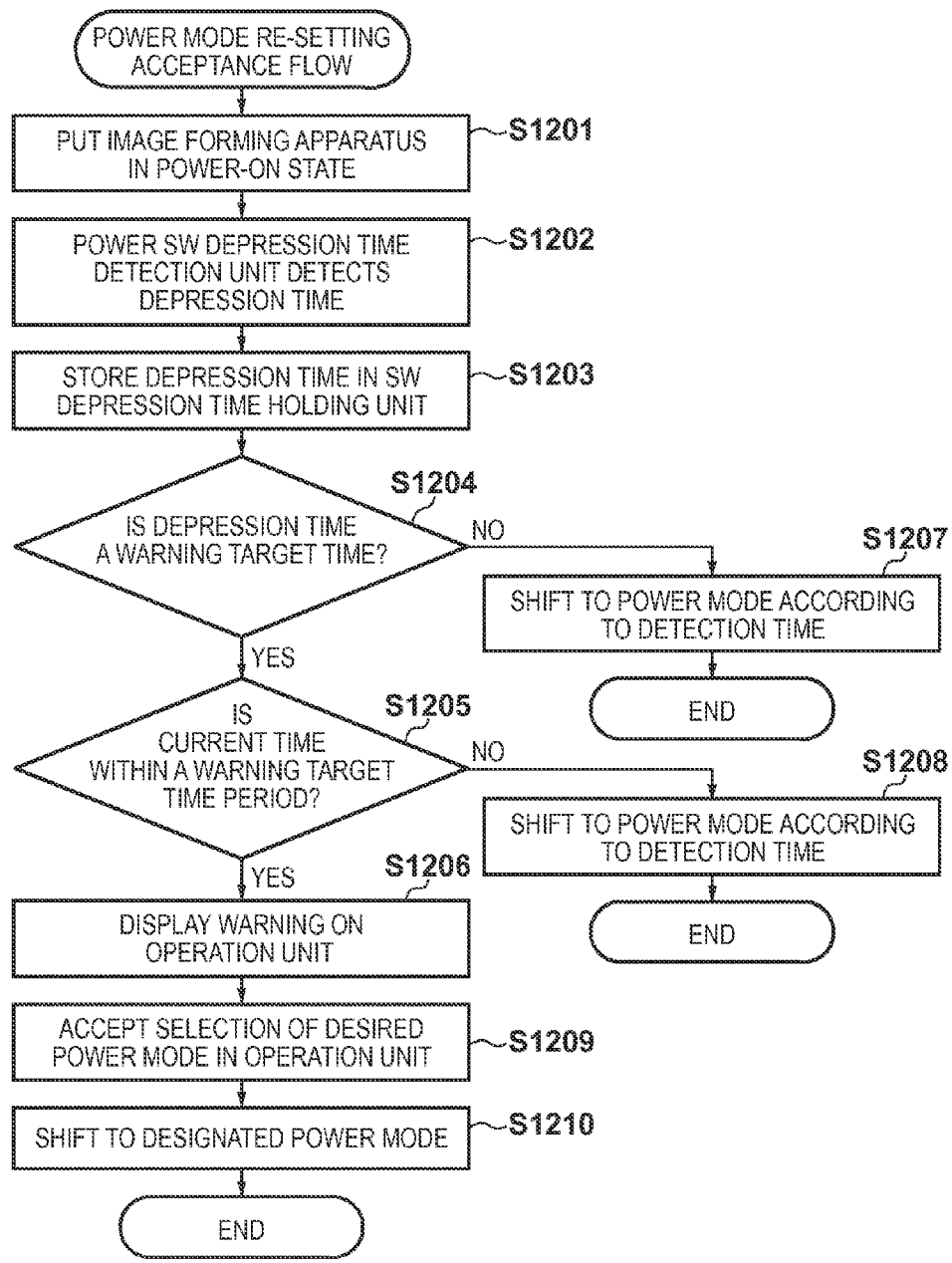
FIG. 12 is a view showing a procedure of the processing of power mode shift control in Embodiment 3.

FIG. 12 is a flowchart showing the procedure of the processing of the power mode shift control in this embodiment. The processing steps shown in FIG. 12 are achieved by execution of the control program in the ROM 302 by the CPU 301, for example.

In S1201, the image forming apparatus 101 is in its power-on state shown in FIG. 3A. In S1202, the power SW depression time detection unit 401 detects and acquires the depression time of the power switch 350. In S1203, the detected depression time is stored in the SW depression time holding unit 504. In S1204, if the depression time of the power switch 350 stored in the SW depression time holding unit 504 satisfies the setting of the warning display condition held in the warning condition holding unit 801, the process proceeds to S1205. If the depression time does not satisfy the setting of the warning display condition held in the warning condition holding unit 801, the process proceeds to S1207. In S1207, the apparatus is shifted to the power mode corresponding to the depression time of the power switch 350. For example, it is shifted to the power-off state shown in FIG. 3B if the depression time is larger than the threshold.

In S1205, it is determined whether the current time received by the RTC I/F unit 805 falls within the warning display time period held in the warning time holding unit 804. If it is determined that the current time falls within the warning display time period, the process proceeds to S1206. Otherwise, the process proceeds to S1208. In S1208, the apparatus is shifted to the power mode corresponding to the depression time of the power switch 350. For example, it is shifted to the high-speed startup standby state shown in FIG. 3D if the depression time is equal to or less than the threshold. In S1206, the operation I/F unit 503 gives an instruction to display the warning message to the operation unit 201.

Figure 13:
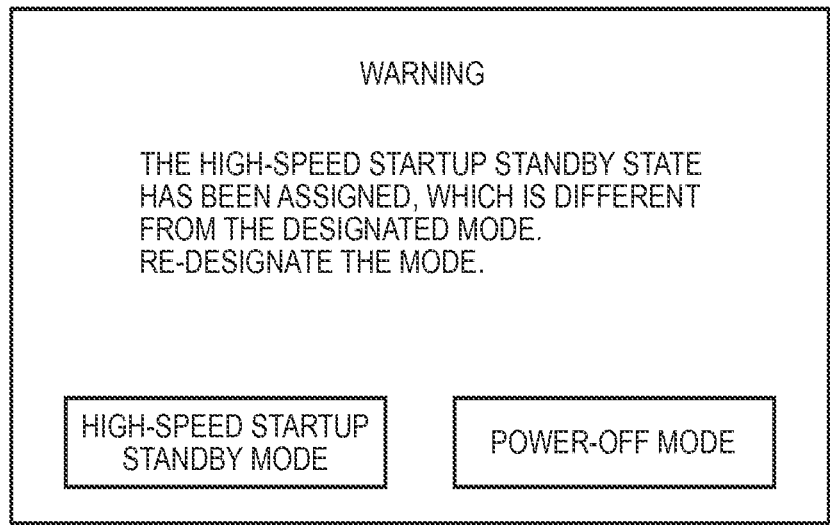
FIG. 13 is a view showing an example of warning message.

FIG. 13 is a view showing an example of the warning message displayed in the operation unit 201. In S1209, as shown in FIG. 13, "The high-speed startup standby state has been assigned, which is different from the designated mode. Re-designate the mode." is displayed so that a shift instruction to either mode can be accepted. If the "high-speed startup standby mode" button is depressed, the image forming apparatus 101 is shifted to the high-speed startup standby state in S1210. If the "power-off mode" button is depressed, the image forming apparatus 101 is shifted to the power-off state in S1210.

As described above, in this embodiment, it is possible to re-accept setting of the power mode shift from the user.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-270705, filed Dec. 11, 2012, which is hereby incorporated by reference herein in its entirety.

What is claimed is:

1. An image forming apparatus having a power button for shifting the image forming apparatus to either a power shutoff state where power supply is shut off or a power-saving state where power supply is limited, a first depression time period of the power button for the power-saving state being different from a second depression time period of the power button for the power shutoff state, the apparatus comprising:
   a first accepting unit constructed to accept a first instruction with the power button depressed;
   a determination unit constructed to determine whether a depression time period of the power button accepted by said first accepting unit is shorter than a threshold which is specified between the first depression time period and the second depression time period;
   a display control unit constructed to, in a case where said determination unit determines that the depression time period is shorter than the threshold, control a display unit to display a screen for notifying to a user a shift to the power-saving state;
   a second accepting unit constructed to accept a second instruction regarding whether to execute the shift to the power-saving state via the screen displayed by said display unit; and
   a power control unit constructed to shift the image forming apparatus to the power-saving state in a case where said second accepting unit accepts the second instruction to execute the shift the power-saving state, and to stop shifting the image forming apparatus to power-saving state in a case where said second accepting unit accepts the second instruction not to execute the shift to the power-saving state.

2. The image forming apparatus of claim 1, further comprising:
   a second determination unit constructed to determine whether or not a time at which the power button is depressed belongs to a predetermined time period, and
   wherein the display control unit controls the display unit to display information indicating that the image forming apparatus is shifting to the power-saving state in a case where said determination unit determines that the depression time period is shorter than the threshold and said second determination unit determines that the time belongs to the predetermined time period.

3. The image forming apparatus of claim 2, further comprising a second holding unit constructed to hold the predetermined time period,
   wherein the predetermined time period held by said second holding unit is specified by the user.

4. The image forming apparatus of claim 3, wherein said display control unit controls the display unit to display warning indicating that the image forming apparatus is shifting to the power-saving state against a specified mode, in a case where said determination unit determines that the depression time period is shorter than the threshold and said second determination unit determines that the time belongs to the predetermined time period.

5. The image forming apparatus of claim 4, wherein the specified mode is a mode in which said power control unit shifts the image forming apparatus to the power shutoff state.

6. The image forming apparatus of claim 1, wherein in a case where said second accepting unit accepts the second instruction not to execute the shift to the power-saving state, said power control unit shifts the image forming apparatus to the power shutoff state.

7. The image forming apparatus of claim 1, wherein in a case where said second accepting unit accepts the second instruction not to execute the shift to the power-saving state, said display control unit controls the display to display a second screen for prompting the user to depress the power button again.

8. The image forming apparatus of claim 1, wherein the power-saving state is a state where power is being supplied to a volatile memory that stores a program for starting up the image forming apparatus.

9. The image forming apparatus of claim 1, further comprising a holding unit constructed to hold the threshold,
wherein the threshold held by said holding unit is specified by the user.

10. The image forming apparatus of claim 1, further comprising a third holding unit constructed to hold a condition, and
wherein said display control unit controls the display unit to display the screen for notifying to the user the shift to the power-saving state in a case where the depression time period meets the condition held by said third holding unit.

11. The image forming apparatus of claim 10, wherein the condition specifies that the depression time period is shorter than the threshold.

12. The image forming apparatus of claim 1, wherein the second accepting unit accepts the second instruction to execute the shift to the power-saving state or the power shutoff state, and
wherein said power control unit shifts the image forming apparatus to the power-saving state in a case where said second accepting unit accepts the second instruction to execute the shift to the power-saving state, and shifts the image forming apparatus to the power shutoff state in a case where said second accepting unit accepts the second instruction to execute the shift to the power shutoff state.

13. A control method executed by an image forming apparatus having a power button for shifting the image forming apparatus to either a power shutoff state where power supply is shut off or a power-saving state where power supply is limited, first depression time period of the power button for the power-saving state being different from a second depression time period of the power button for the power shutoff state, the method comprising:

a first accepting unit constructed to accept a first instruction with the power button depressed;
a determination unit constructed to determine whether a depression time period of the power button accepted by said first accepting unit is shorter than a threshold which is specified between the first depression time period and the second depression time period;
a display control unit constructed to, in a case where said determination unit determines that the depression time period is shorter than the threshold, control a display unit to display a screen for notifying to a user a shift to the power-saving state;
a second accepting unit constructed to accept a second instruction regarding whether to execute the shift to the power-saving state via the screen displayed by said displaying unit; and
a power control step of shifting the image forming apparatus to the power-saving state in a case where said second accepting unit accepts the second instruction to execute the shift to the power-saving state, and to stop shifting the image-forming apparatus to the power-saving state in a case where said second accepting unit accepts the second instruction not to execute the shift to the power-saving state.

14. A non-transitory computer-readable memory medium for an image forming apparatus having a power button for shifting the image forming apparatus to either a power shutoff state where power supply is shut off or a power-saving state where power supply is limited, a first depression time period of the power button for the power-saving state being different from a second depression time period of the power button for the power shutoff state, the medium storing a program for allowing a computer to execute:

a first accepting step of accepting a first instruction with the power button depressed;
a determination step of determining whether a depression time period of the power button accepted in the first accepting step is shorter than a threshold which is specified between the first depression time period and the second depression time period;
a display control step of, in a case where the determination step determines that the depression time period is shorter than the threshold, controlling a display unit to display a screen for notifying to a user a shift to the power-saving state;
a second accepting step of accepting a second instruction regarding whether to execute the shift to the power-saving state via the screen displayed by the display unit; and
a power control step of shifting the image forming apparatus to the power-saving state in a case where the second accepting step accepts the second instruction to execute the shift the power-saving state, and of stopping the shift of the image forming apparatus to power-saving state in a case where the second accepting step accepts the second instruction not to execute the shift to the power-saving state.

* * * * *